United States Patent [19]
Bailleux

[11] Patent Number: 5,588,719
[45] Date of Patent: Dec. 31, 1996

[54] ANTI-WHEEL-LOCK BRAKING SYSTEM FOR A MOTOR VEHICLE

[75] Inventor: Francois Bailleux, Val D'Albian, France

[73] Assignees: Automobiles Peugeot, Paris; Automobiles Citroen, Neuilly Sur Seine, both of France

[21] Appl. No.: 297,884

[22] Filed: Aug. 30, 1994

[30]   Foreign Application Priority Data

Sep. 2, 1993 [FR] France .................................. 93 10466

[51] Int. Cl.$^6$ ............................................... B60T 8/88
[52] U.S. Cl. ................... 303/122.04; 303/113.4
[58] Field of Search .............................. 303/2, 7, 20, 92, 303/111, 113.1, 113.5, 113.4, 122.04, 122.05, 122.02; 364/426.02

[56]   References Cited

U.S. PATENT DOCUMENTS

| | | | |
|---|---|---|---|
| 4,088,376 | 5/1978 | Lindemann et al. | 303/111 X |
| 4,335,430 | 6/1982 | Ohmori et al. | 303/92 X |
| 4,345,796 | 8/1982 | Reinecke | 303/92 |
| 5,042,883 | 8/1991 | McCann et al. | 303/7 |
| 5,255,962 | 10/1993 | Neuhaus et al. | 303/111 |
| 5,350,225 | 9/1994 | Steiner et al. | 303/113.4 |

FOREIGN PATENT DOCUMENTS

| | | |
|---|---|---|
| 2391096 | 12/1978 | France . |
| 2544268 | 10/1984 | France . |
| 2162914 | 2/1986 | United Kingdom . |

*Primary Examiner*—Lee W. Young
*Attorney, Agent, or Firm*—Burns, Doane, Swecker & Mathis, L.L.P.

[57]   ABSTRACT

An anti-wheel-lock braking system for a motor vehicle includes a main electronic controller having a device for detecting a failure of the main controller and an emergency electronic controller, independent of the main controller and provided with apparatus to decrease braking of the rear wheels when failure of the main controller is detected.

14 Claims, 2 Drawing Sheets

ANTI-WHEEL-LOCK BRAKING SYSTEM FOR A MOTOR VEHICLE

BACKGROUND OF THE INVENTION

The present invention generally concerns a braking arrangement for a motor vehicle. More particularly, the invention relates to an anti-wheel lock braking system controlled by a main electronic controller.

In braking arrangements for motor vehicles, it is known to associate anti-lock systems with a conventional braking system. Such anti-lock systems have rear braking distributors designed to modulate the rear brake as a function of pressure on the vehicle brake pedal to prevent the rear brakes from locking before the front brakes. In such an arrangement the distributor thus has two functions. Since the rear wheels can never lock, the distributor is therefore not useful for the braking function.

As a result, it is also known to provide an anti-lock braking system which does not use rear braking distributors. However, that arrangement presents a problem when the anti-lock system malfunctions, since then there is a risk that the driver may lose control of the vehicle.

OBJECTS AND SUMMARY OF THE INVENTION

An object of the present invention is to provide a braking arrangement which remedies the drawback of a braking arrangement equipped with an anti-lock system, in the absence of a rear braking distributor.

To achieve this object, the braking arrangement according to the invention includes an emergency electronic controller independent of the main controller. The main controller is equipped with means to detect a failure of the main controller. Moreover, a means is provided to decrease braking of the rear wheels when failure of the main controller is detected.

According to a further advantageous characteristic of the invention, the means for detecting a failure of the main controller is designed to interrupt the latter's action on the solenoid valves of the anti-lock system when such a failure is detected.

According to another characteristic of the invention, the means for decreasing braking of the rear wheels is designed to eliminate braking of the rear wheels in the event of failure of the main controller.

According to yet another advantageous characteristic of the invention, the means for decreasing braking of the rear wheels is designed to reduce braking of the rear wheels in the event of failure of the main controller.

BRIEF DESCRIPTION OF THE DRAWINGS

Many other objects and advantages of the present invention will be apparent to those skilled in the art when this specification is read in conjunction with the attached schematic drawings, provided solely as examples illustrating an embodiment of the invention, wherein like reference numeral have been applied to like elements and wherein.

DETAILED DESCRIPTION OF THE PREFERRED EMBODIMENT

Figure 1:
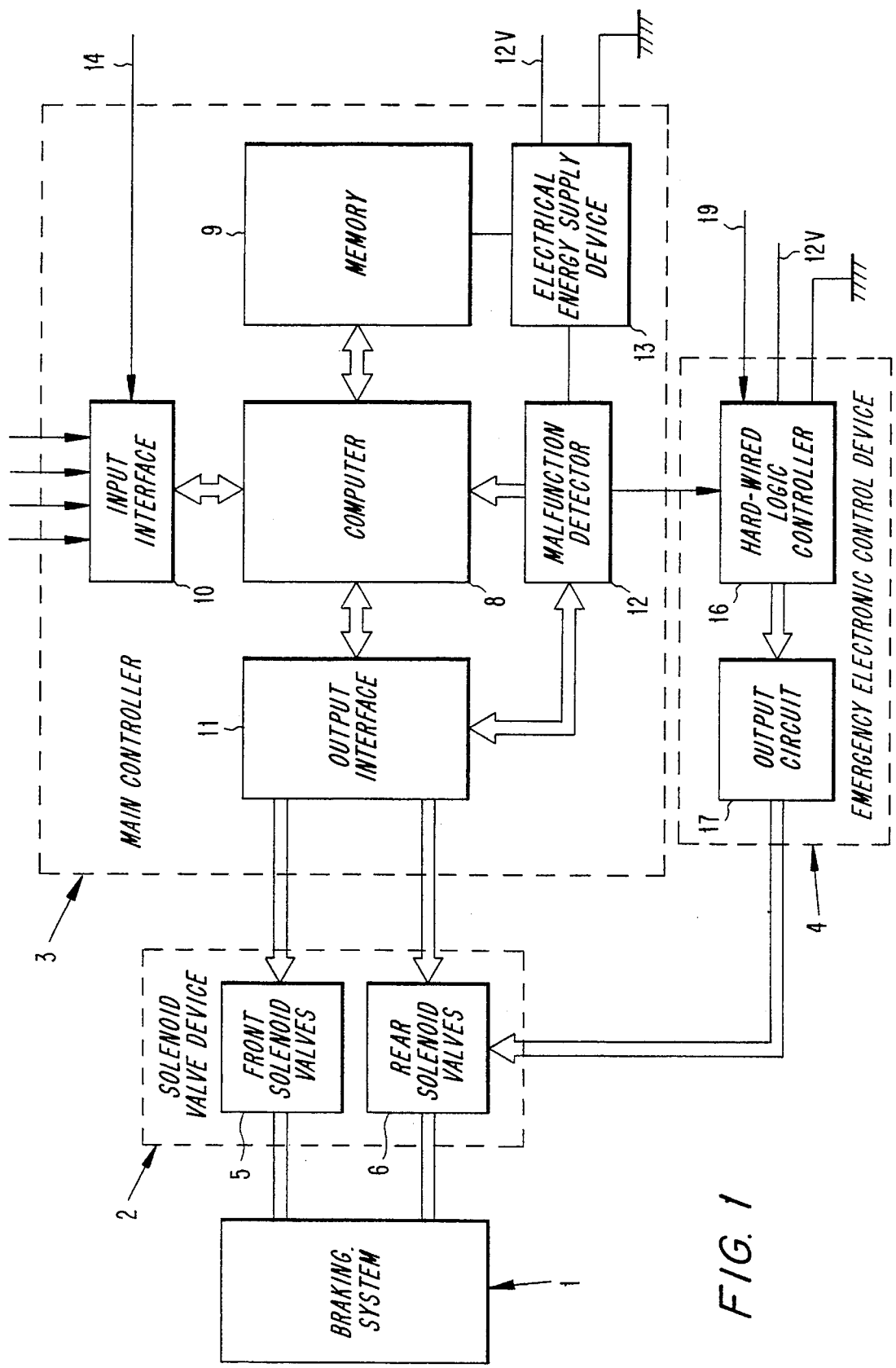
FIG. 1 schematically depicts, in the form of a block diagram, the structure of a braking arrangement according to the invention.

As is evident from FIG. 1, the braking arrangement for a motor vehicle according to the present invention includes a conventional braking system 1 with which are associated a solenoid valve device 2 having the eight solenoid valves of an anti-lock system, called ABS system, of the kind known in the art; a main controller 3 for solenoid valve device 2; and an emergency electronic control device 4. The solenoid valve device 2 is divided into two groups 5, 6 representing the front solenoid valves AV and rear solenoid valves AR, respectively.

The main controller 3 substantially comprises a computer 8 with which are associated a memory 9; an input interface 10 receiving the four data signals concerning the wheel velocities, symbolized by four arrows; an output interface 11 providing control of front solenoid valves 5 and rear solenoid valves 6; a malfunction detector 12; and electrical energy supply device 13 which is connected at one terminal to ground and at another terminal to a voltage of, for example, 12 V. Note also that input interface 10 also receives, at 14, a data signal from the brake pedal.

The emergency secondary controller 4 substantially comprises a hard-wired logic element 16 and an output circuit 17 through which said emergency secondary controller acts on the rear solenoid valves 6 as shown by the figure, and optionally on the front solenoid valves 5 as symbolized by a dashed line. The hard-wired logic controller 16 receives, at 19, information from the brake pedal. The emergency secondary controller 4 is also connected to a power source, for example 12 V. Said power source is independent of the power source 13 of the main controller 3. The two power sources may possibly be connected to the vehicle battery, but via different fuses and wires. In this way the emergency secondary controller 4 is completely autonomous with regard to its electrical power supply.

The emergency secondary controller 4 is designed to ensure operation of the solenoid valves 5, 6 when the main controller 3 signals to the emergency secondary controller 4 that the main controller 3 is malfunctioning after the malfunction has been detected by malfunction detector 12.

Two operating modes are possible for the arrangement according to the invention.

In a first operating mode, when there is a malfunction of the ABS system, the two rear brake receptors are withdrawn and all braking is performed by the front brakes. The logic is simplest in this embodiment, since it consists in deactivating the rear brakes to prevent them from locking. The emergency secondary controller 4 closes the inlet solenoid valves when it simultaneously receives the following data:

Main controller malfunction; and

Actuation of the brake pedal (rear brake light illumination switch in use).

In the second operating mode, in the event of a malfunction of the ABS system, the solenoid valves 6 are actuated by the emergency secondary electronic controller 4 to reduce pressure in the rear brakes.

Figure 2:
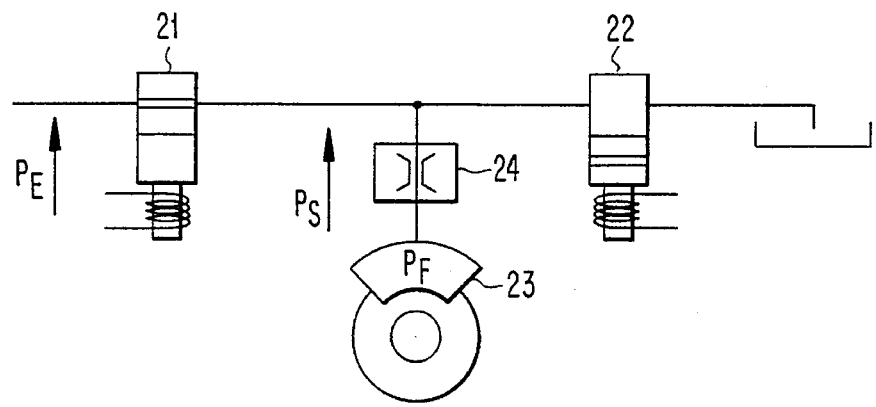
FIG. 2 schematically illustrates the braking circuit associated with each rear wheel according to the present invention.

Operation of the arrangement will be explained with reference to FIGS. 2 and 3. FIG. 2 shows an inlet solenoid valve 21 and outlet solenoid valve 22 respectively, and a rear brake caliper 23 that is connected with fluid communication, via a nozzle or orifice 24, to the hydraulic circuit connecting the two solenoid valves 21, 22. Hydraulic pressure $P_E$ acts upstream of the inlet solenoid valve; hydraulic pressure $P_S$ acts downstream of the inlet solenoid valve 21 and upstream of the outlet solenoid valve 22; pressure $P_F$ is the hydraulic braking pressure at the rear brake caliper 23. The solenoid valves 21, 22 are depicted in the inactive position, i.e. the voltage at their terminals is zero. $U_A$ (see FIG. 3) indicates the voltage at the terminals of inlet solenoid valve 21, while $U_E$ represents the voltage at the terminals of outlet solenoid valve 22. In the inactive position, inlet solenoid valve 21 is open while the inactive position of the outlet solenoid valve 22 is closed.

Figure 3:
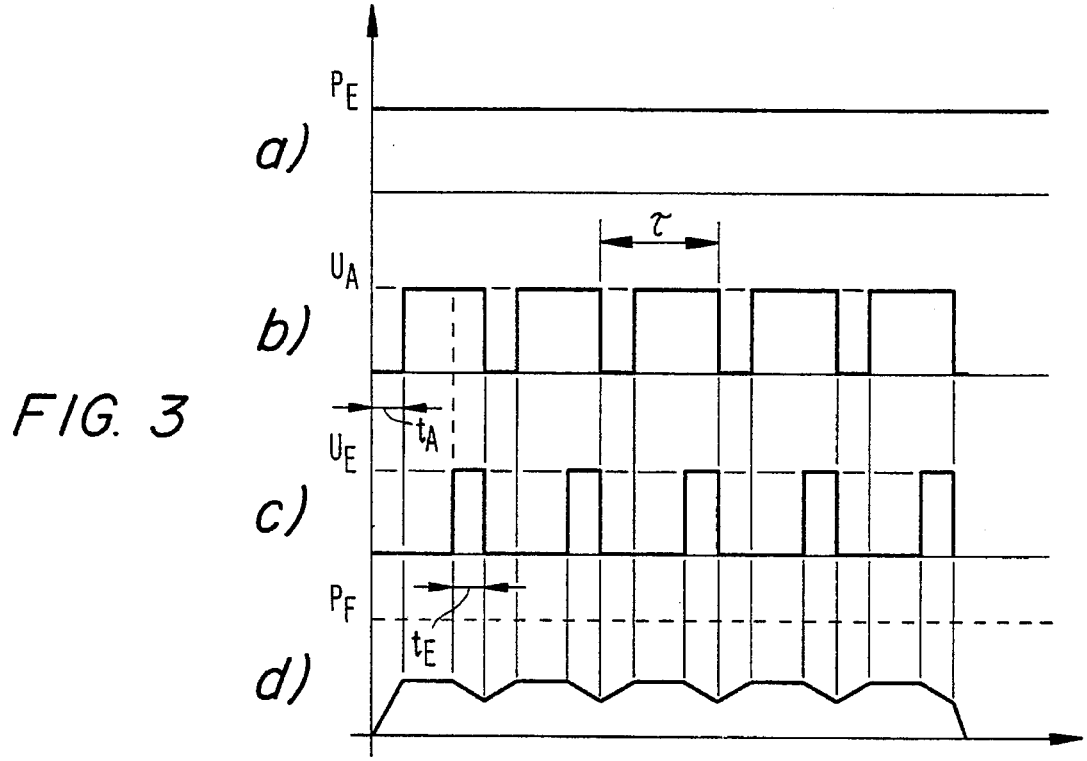
FIG. 3 shows, by means of four diagrams a to d, the operation of the circuit according to FIG. 2.

FIG. 3 explains how braking pressure $P_F$ for brake caliper 23, indicated in FIG. 3d, is obtained from the conditions indicated in FIGS. 3a to 3c.

During a time period τ [tau], operation is as follows:

From 0 to $t_A$, the inlet solenoid valve 21 receives no electrical power.

It is therefore open, and braking pressure $P_F$ increases.

From $t_A$ to (τ[tau]-$t_E$), the inlet solenoid valve 21 is activated, i.e. it receives electrical power and is closed so that braking pressure $P_F$ is constant.

From (τ[tau]-$t_E$) to τ[tau], the outlet solenoid valve 22 is activated to empty or depressurize the circuit, as a result of which braking pressure $P_F$ decreases.

Under these conditions the following equation can be formulated:

$$P_F = K \times P_E$$

where K is a function of $t_A$, $t_E$, τ[tau]. For example, if $t_A = t_E = ¼τ[tau]$, the approximate result is $P_F = ½ P_E$.

Note that the function of nozzle 24 is to smooth out pressure $P_S$ to obtain $P_F$.

Referring to FIG. 2, it is also evident that deactivation of rear braking according to the first operating mode is obtained by closing the inlet solenoid valve 21 and opening the outlet solenoid valve 22.

Based on the explanations above, the operation of the emergency logic element 4 can be summarized as follows:

When the main controller 3 malfunctions, the output interface 11 is inactive and the solenoid valves 21, 22 are no longer controlled by the main controller 3. But, when the malfunction detector 12 detects a malfunction of the main controller 3 it also signals the operating fault to the emergency secondary controller 4 which then assumes control of the solenoid valves;

The output commands of the emergency secondary controller 4 are actuated when the latter receives, simultaneously with the malfunction signal, the "brake pedal actuated" datum or an equivalent datum (given, for example, by a sensor linked to the brake pedal or the brake lights, by a pressure sensor in the front brake circuit, or by an accelerometer);

The emergency secondary controller 4 is preferably used only for the rear solenoid valves 6;

The emergency secondary controller 4 may also monitor proper operation of the front solenoid valves 5, either by monitoring the electrical current flowing into the front solenoid valves 5, or via a datum provided by the main controller 3 which is capable of detecting whether the front solenoid valves 5 are good. In this case an additional connection (not shown) is needed.

It will now be apparent to those skilled in the art that an anti-lock braking system which overcomes the problems associated with prior art systems has been provided. Moreover, it will be apparent that numerous modifications, variations, substitutions, and equivalents exist for elements of the invention which do not materially depart from the spirit and scope of the invention. Accordingly, it is expressly intended that all such modifications, variations, substitutions and equivalents for features of the invention which fall within the spirit and scope of the appended claims shall be embraced thereby.

What is claimed is:

1. An anti-lock braking system for a motor vehicle having front and rear wheels, comprising:

a main electronic controller including (i) wheel speed inputs and (ii) means to detect a failure of the main electronic controller and to generate a signal independently of wheel speed inputs when the main electronic controller fails; and an emergency electronic controller independent of the main electronic controller and independent of wheel speed inputs, having means to directly decrease braking of the rear wheels when the means to detect a failure generates a signal that a failure of the main electronic controller is detected.

2. An anti-lock braking system according to claim 1, wherein the means for detecting a failure of the main electronic controller is designed to interrupt the main electronic controller's action following detection of such a failure.

3. An anti-lock braking system according to claim 1 wherein the main controller further comprises a computer having an input interface designed to receive outside data, and an output interface for controlling solenoid valves, a memory and an electrical energy supply device.

4. An anti-lock braking system according to claim 1 wherein: the main electronic controller includes a first electrical energy supply source; and the emergency controller includes a second electrical energy supply source independent of
the first electrical energy supply source for the main electronic controller.

5. An anti-lock braking system according to claim 1, wherein the means for decreasing braking of the rear wheels is operable to deactivate braking of the rear wheels in the event of failure of the main electronic controller.

6. An anti-lock braking system according to claim 1 wherein means for decreasing braking of the rear wheels is operable to reduce braking of the rear wheels in the event of failure of the main electronic controller.

7. An anti-lock braking system according to claim 1, wherein a braking circuit for a rear wheel comprises an inlet solenoid valve, an outlet solenoid valve, and a rear brake caliper mounted between inlet solenoid valve and the outlet solenoid valve.

8. An anti-lock braking system according to claim 7, wherein deactivation of rear braking is accomplished by setting the inlet solenoid valve to a closed position and setting the outlet solenoid valve to an open position.

9. An anti-lock braking system according to claim 7, wherein the means to decrease braking provides a rear braking pressure by simultaneously opening the inlet solenoid valve and closing outlet solenoid valve, and by then opening the outlet solenoid valve while maintaining the inlet solenoid valve in the closed position.

10. An anti-lock braking system according to claim 1, including rear solenoid valves and wherein the emergency controller controls the rear solenoid valves and acts on the rear brakes upon simultaneous reception of data indicating failure of the main controller and data indicating actuation of the brake pedal.

11. An anti-lock braking system according to claim 10, wherein the data indicating actuation of the brake pedal is generated by one of the group consisting of a sensor connected to the pedal, a sensor connected to the brake lights, a pressure sensor in the front brake circuit, and an accelerometer.

12. An anti-lock braking system according to claim 1, including front solenoid valves and wherein the emergency electronic controller further includes means for monitoring proper operation of the front solenoid valves.

13. An anti-lock braking system according to claim 12, wherein the means for monitoring involves monitoring the current passing into the front solenoid valves.

14. An anti-lock braking system according to claim 12, wherein the means for monitoring involves monitoring a datum issued by the main controller.

* * * * *